(12) United States Patent
Naruse et al.

(10) Patent No.: US 9,598,589 B2
(45) Date of Patent: Mar. 21, 2017

(54) INKJET INK, INK CARTRIDGE CONTAINING THE INKJET INK, INKJET RECORDING METHOD USING THE INKJET INK, INKJET RECORDING APPARATUS USING THE INK CARTRIDGE, AND PRINT FORMED BY THE INKJET INK

(71) Applicants: Mitsuru Naruse, Shizuoka (JP); Minoru Hakiri, Shizuoka (JP); Masayasu Nonogaki, Shizuoka (JP)

(72) Inventors: Mitsuru Naruse, Shizuoka (JP); Minoru Hakiri, Shizuoka (JP); Masayasu Nonogaki, Shizuoka (JP)

(73) Assignee: RICOH COMPANY, LTD., Tokyo (JP)

(*) Notice: Subject to any disclaimer, the term of this patent is extended or adjusted under 35 U.S.C. 154(b) by 886 days.

(21) Appl. No.: 13/957,673

(22) Filed: Aug. 2, 2013

(65) Prior Publication Data

US 2014/0077486 A1 Mar. 20, 2014

(30) Foreign Application Priority Data

Sep. 14, 2012 (JP) .................................. 2012-202692

(51) Int. Cl.
*C09D 11/00* (2014.01)
*C09D 11/30* (2014.01)
*C09D 11/326* (2014.01)
*C09D 11/106* (2014.01)
*C09D 11/107* (2014.01)

(52) U.S. Cl.
CPC ............ *C09D 11/30* (2013.01); *C09D 11/106* (2013.01); *C09D 11/107* (2013.01); *C09D 11/326* (2013.01)

(58) Field of Classification Search
CPC ... C09D 11/326; C09D 11/107; C09D 11/106; C09D 11/30
See application file for complete search history.

(56) References Cited

U.S. PATENT DOCUMENTS

| | | |
|---|---|---|
| 2003/0196571 A1 | 10/2003 | Hakiri et al. |
| 2004/0115370 A1 | 6/2004 | Funakoshi et al. |
| 2004/0138337 A1 | 7/2004 | Hasegawa et al. |
| 2005/0117008 A1 | 6/2005 | Konishi |
| 2006/0209149 A1 | 9/2006 | Hasegawa et al. |
| 2006/0272543 A1 | 12/2006 | Hakiri et al. |
| 2008/0036830 A1 | 2/2008 | Natori et al. |
| 2008/0036840 A1 | 2/2008 | Hakiri et al. |
| 2010/0080925 A1 | 4/2010 | Araki et al. |
| 2010/0277548 A1 | 11/2010 | Hakiri et al. |
| 2010/0302306 A1 | 12/2010 | Hasegawa et al. |
| 2010/0309260 A1 | 12/2010 | Hakiri et al. |
| 2011/0071250 A1 | 3/2011 | Naruse et al. |
| 2011/0074865 A1 | 3/2011 | Hasegawa et al. |
| 2011/0267398 A1 | 11/2011 | Hakiri et al. |
| 2012/0026237 A1 | 2/2012 | Hakiri et al. |
| 2012/0026238 A1 | 2/2012 | Ganapathiappan et al. |
| 2012/0062646 A1 | 3/2012 | Hasegawa et al. |
| 2012/0092411 A1 | 4/2012 | Hakiri et al. |
| 2012/0154492 A1 | 6/2012 | Hakiri et al. |
| 2012/0262518 A1 | 10/2012 | Naruse et al. |
| 2013/0147876 A1 | 6/2013 | Hakiri et al. |
| 2013/0182056 A1 | 7/2013 | Morohoshi et al. |
| 2013/0242013 A1 | 9/2013 | Nonogaki et al. |

FOREIGN PATENT DOCUMENTS

| | | | |
|---|---|---|---|
| CN | 1503736 | | 6/2004 |
| CN | 1659245 | | 8/2005 |
| CN | 102395633 | | 3/2012 |
| JP | 11-199805 | | 7/1999 |
| JP | 2004-009463 | | 1/2004 |
| JP | 2006-016458 | | 1/2006 |
| JP | 2006016458 | A * | 1/2006 |
| JP | 2010-100833 | | 5/2010 |

OTHER PUBLICATIONS

U.S. Appl. No. 13/826,300, filed Mar. 14, 2013.
Chinese official action dated Aug. 22, 2014 in corresponding.
Chinese patent application No. 2013 10 39 8680.2.

* cited by examiner

*Primary Examiner* — Wenwen Cai
(74) *Attorney, Agent, or Firm* — Cooper & Dunham LLP

(57) ABSTRACT

An inkjet ink is provided. The inkjet ink includes water; a penetrant, a pigment, and a polymer compound. The polymer compound includes a unit (A) including a functional group having the below-mentioned formula (1) or (2), and another unit (B) including a carboxyl group. The unit (A) is included in the polymer compound in an amount of from 30% to 90% by weight based on the total weight of the polymer compound.

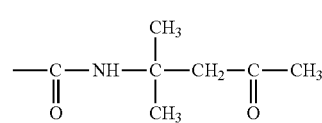

(1)

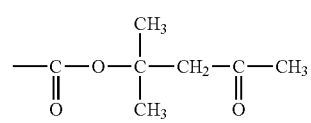

(2)

7 Claims, 3 Drawing Sheets

INKJET INK, INK CARTRIDGE CONTAINING THE INKJET INK, INKJET RECORDING METHOD USING THE INKJET INK, INKJET RECORDING APPARATUS USING THE INK CARTRIDGE, AND PRINT FORMED BY THE INKJET INK

CROSS-REFERENCE TO RELATED APPLICATIONS

This patent application is based on and claims priority pursuant to 35 U.S.C. §119 to Japanese Patent Application No. 2012-202692 filed on Sep. 14, 2012 in the Japan Patent Office, the entire disclosure of which is hereby incorporated by reference herein.

TECHNICAL FIELD

This disclosure relates to an inkjet ink. In addition, this disclosure relates to an ink cartridge containing the inkjet ink, and to an inkjet recording method using the inkjet ink. Further, this disclosure relates to an inkjet recording apparatus using the inkjet cartridge. Furthermore, this disclosure relates to a print formed by the inkjet ink.

BACKGROUND

Since inkjet recording methods have advantages over other image recording methods such that the process is simple; full color images can be produced relatively easily; and high resolution images can be produced even when an apparatus having a simple structure is used, inkjet recording methods become prevalent.

Inkjet recording methods typically include ejecting ink droplets using an air bubble generated in the ink by heat, a pressure generated in the ink by piezoelectricity, or an electrostatic force, so that the ink droplets are adhered to a recording medium such as paper sheets; and then quickly drying the ink droplets (or allowing the ink droplets to penetrate into the recording medium) so that the ink droplets dry, resulting in formation of an ink image on the recording medium. Thus, inkjet recording methods are simple, and can be used not only for personal purposes but also for industrial purposes such as printers and printing machines.

With expansion of industrial applications of inkjet recording, a need exists for an inkjet recording apparatus which can form images on various recording media (such as various papers) at a high speed. Specifically, a need exists for an inkjet printer having a line recording head to form images at a high speed. In addition, an increasing need exists for an inkjet printer, which uses an aqueous ink from environmental and safety standpoint.

However, image formation using an aqueous ink is considerably affected by the recording medium used, and various image problems are caused thereby. Particularly, when a plain paper having no coat layer on the surface thereof is used as a recording medium, various problems are caused. Since aqueous inks have a long drying time while having good affinity for paper, aqueous inks easily penetrate into recording paper. Particularly, when an aqueous ink image is formed on an uncoated paper having a rough surface, the colorant included in the aqueous ink penetrates into the paper, thereby causing a problem in which a low density image is formed and which is not caused when a solvent ink is used.

Particularly, when high speed image formation is performed by using an aqueous ink, a penetrant is typically included in the aqueous ink to shorten the drying time of the ink adhered to a recording medium. However, when a penetrant is included in an aqueous ink, not only penetration of water into recording media but also penetration of the colorant included in the aqueous ink into recording media is enhanced, thereby producing images having lower image density than in a case where the penetrant is not used for the aqueous ink.

In order to perform high speed image formation, it is preferable that change of the properties of the ink is small even when the environmental conditions change, or after long repeated use (i.e., preservation stability of the ink is good), and defective images such as omissions and white streak images, which are caused by clogging of nozzles of an inkjet recording head with the ink when the ink is ejected from the nozzles, are not formed (i.e., ejection stability of the ink is good).

In particular, since pigments are typically hydrophobic, aqueous inks including a pigment tend to have poor preservation stability. Therefore, a dispersant is typically used for aqueous inks including a pigment to improve preservation stability of the inks. However, the preservation stability of such aqueous inks is not yet complete. In addition, since resistance of aqueous inks to nozzles of an inkjet recording head is large, ejection stability of aqueous inks is not yet complete.

JP-H11-199805-A discloses an ink including a polycarbonyl compound and a semicarbazide derivative. In addition, a compound including diacetone acrylamide and methacrylic acid, in which the content of diacetone acrylamide is not greater than 20% by weight, is disclosed thereby.

JP-2004-9463-A discloses a pretreatment liquid including a saponified material of a copolymer of diacetone acrylamide-fatty acid vinyl ester, and an ink including a hydrazine compound. In this regard, the hydrazine compound included in the ink is reacted with the saponified material of a copolymer of diacetone acrylamide-fatty acid vinyl ester in the pretreatment liquid so as to crosslink, so that the ink is improved in properties such as bleeding property, water resistance, and rub resistance.

JP-2006-16458-A discloses an ink including a pigment covered with a resin having a N-substituted methacrylamide unit and a carbonyl group. In addition, the ink can further include an optional hydrazine compound. Diacetone acrylamide is exemplified as a monomer having a carbonyl group, but the content thereof is not greater than 50%.

The ink of JP-H11-199805-A is proposed to improve water resistance and fixability thereof. However, as a result of the present inventors' investigation, the ink has insufficient ejection stability and preservation stability, and images produced by the ink have low image density. In addition, the ink of JP-2004-9463-A has insufficient ejection stability and preservation stability, and images produced by the ink have low image density. In addition, since the resin in the ink of JP-2006-16458-A, which has a N-substituted methacrylamide unit and a carbonyl group, has both a cationic group and an anionic group, the ink tends to easily agglomerate. Therefore, the ink has insufficient ejection stability and preservation stability, and images produced by the ink have low image density.

SUMMARY

The object of this disclosure is to provide an inkjet ink which has a good combination of preservation stability and ejection stability and which can produce high density images even on plain papers.

As an aspect of this disclosure, an inkjet ink is provided which includes water, a penetrant, a pigment, and a polymer compound. The polymer compound includes a unit (A) including a functional group having the below-mentioned formula (1) or (2), and another unit (B) including a carboxyl group. The unit (A) is included in the polymer compound in an amount of from 30 to 90% by weight based on the total weight of the polymer compound.

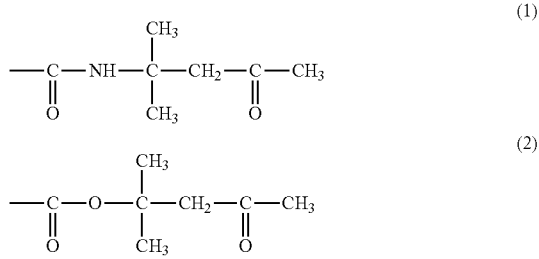

As another aspect of this disclosure, an ink cartridge is provided which includes a container, and the above-mentioned inkjet ink contained in the container.

As another aspect of this disclosure, an inkjet recording apparatus is provided which includes the above-mentioned ink cartridge; and an inkjet recording head to eject droplets of the inkjet ink contained in the ink cartridge to form an ink image of the inkjet ink on a recording medium.

As another aspect of this disclosure, an inkjet recording method is provided which includes ejecting droplets of the above-mentioned inkjet ink to form an ink image of the inkjet ink on a recording medium.

As another aspect of this disclosure, a print is provided which includes a support, and an ink image of the above-mentioned inkjet ink located on the support.

The aforementioned and other aspects, features and advantages will become apparent upon consideration of the following description of the preferred embodiments taken in conjunction with the accompanying drawings.

DETAILED DESCRIPTION

Figure 1:
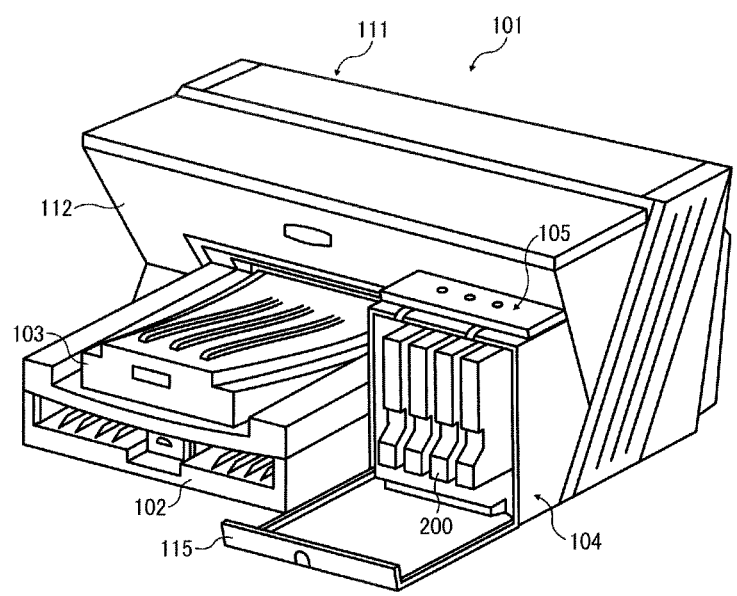
FIG. 1 is a schematic perspective view illustrating a serial inkjet recording apparatus as an inkjet recording apparatus according to an embodiment.

Initially, the inkjet ink of this disclosure will be described.

The inkjet ink (hereinafter referred to as an ink) of this disclosure includes at least water, a penetrant, a pigment, and a polymer compound.

As a result of the present inventors' investigation, it is found that by increasing the ratio of a unit (A) of the polymer compound including a functional group having the below-mentioned formula (1) or (2) so as to be higher than ever while combining a unit (B) including a carboxyl group with the unit (A), the preservation stability and ejection stability of the ink can be enhanced to a level to which conventional techniques cannot enhance the preservation stability and ejection stability.

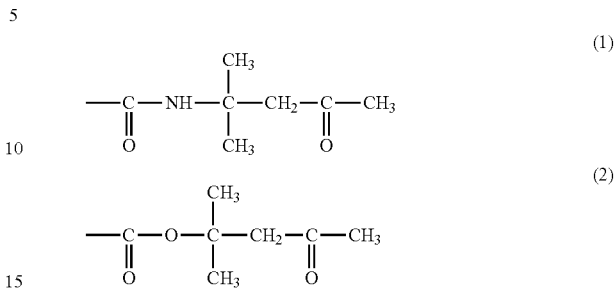

The reason therefor is not yet determined but is considered to be as follows.

Specifically, it is found that when the ratio of the unit (A) is increased, adsorption of the polymer compound on a pigment can be enhanced, and in addition when the ratio is further increased, the fluidity of an aqueous solution of the polymer compound is enhanced. It is considered from these facts that when the ratio of the unit (A) is increased, the polymer compound is adsorbed on the surface of a pigment, and a carboxyl group in the unit (B) can be imparted to the surface of the pigment, thereby enhancing the stability of the pigment in an aqueous ink (i.e., enhancing preservation stability of the ink).

The ratio of the unit (A), which can impart good preservation stability to the ink, is not less than 30% by weight based on the total weight of the polymer compound included in the ink. When the ratio of the unit (A) is further increased, the fluidity of the ink is enhanced, and resistance of the ink to nozzles of an inkjet recording head decreases, thereby enhancing the ejection stability of the ink. When the ratio of the unit (A) is not less than 60% by weight, the ejection stability enhancing effect can be remarkably produced.

Since the unit (B) has a function to enhance affinity of the polymer compound for water, the unit (B) contributes to enhancement of preservation stability. In addition, when the carboxyl group of the unit (B) is a potassium salt, the image density of images produced by the ink can be further heightened.

It is known that the functional group having formula (1) and a hydrazide compound cause a crosslinking reaction. Therefore, it has been conventionally tried to enhance water resistance and binding force (rub resistance) of ink images by causing such a crosslinking reaction when an ink is adhered to a recording medium and then dried. In this regard, including the unit having the functional group having formula (1) in an amount of 20% by weight is enough to produce the effect. When the ratio of the unit is further increased, the ratios of other units having other functional groups, which contribute to binding force of the polymer compound with other materials, decrease, thereby deteriorating the binding force of ink images with recording media. Therefore, the ratio of the unit including the functional group having formula (1) is controlled so as to be not greater than 20% buy weight.

It is discovered by the present inventors that by using a hydrazide compound in combination with the above-mentioned polymer compound, the image density of images produced by the ink can be remarkably enhanced. The reason therefor is considered to be as follows.

In conventional inks, since the ratio of the unit (A) is relatively small, increase of viscosity of the ink due to a rapid crosslinking reaction caused when the ink adheres to a recording medium such as paper is not caused, and therefore the ink penetrates into the recording paper, resulting in decrease of image density. In contrast, in the ink of this disclosure the ratio of the unit (A) is larger than that in conventional inks, a rapid crosslinking reaction is caused, thereby rapidly increasing the viscosity of the ink adhered to a recording paper. Therefore the pigment in the ink remains on the surface of the recording paper, resulting in increase of image density.

(Polymer Compound)

The polymer compound in the ink of this disclosure includes a unit (A) including a functional group having formula (1) or (2), and another unit (B) having a carboxyl group. The ratio of the unit (A) is from 30 to 90% by weight, and preferably from 60 to 90% by weight, based on the total weight of the polymer compound. When the ratio is greater than 90% by weight, the polymer is not soluble in water, and therefore it is difficult to use such a large amount of polymer compound for the ink.

The monomer, which can form the unit (A), is not particularly limited as long as the monomer has the functional group having formula (1) or (2) and can react with a monomer, which can form the unit (B). Specific examples of such a monomer include diacetone acrylamide, diacetone methacrylamide, diacetone acrylate, and diacetone methacrylate. Among these monomers, diacetone acrylamide is preferable because of having good effects to enhance the preservation stability and ejection stability.

The monomer, which can form the unit (B), is not particularly limited as long as the monomer can form a unit having a carboxyl group. Specific examples of such a monomer include acrylic acid, methacrylic acid, itaconic acid, maleic acid, butenetricarboxylic acid, and fumaric acid. Among these monomers, methacrylic acid, acrylic acid, and maleic acid are preferable because of imparting a good combination of preservation stability and ejection stability to the ink.

The carboxyl group of the unit (B) is preferable a salt of a carboxylic acid such as salts of alkali metals such as Li, Na and K; salts of organic amines such as ammonium, mono-, di- or tri-methylamine, mono-, di- or tri-ethylamine, monoethanolamine, diethanolamine, triethanolamine, methylethanolamine, methyldiethanolamine, dimethylethanolamine, choline, aminoethanepropanediol, monopropanolainine, dipropanolmine, tripropanolamine, isopropanolamine, tris(hydroxymethyl)aminomethane, and aminoethylpropanediol; and cyclic amines such as morpholine, and N-methyl-2-pyrrolidone. Among these salts, potassium salts are preferable because of producing good image density enhancing effect.

In order to produce a carboxylic acid salt group, both a method in which a monomer having a carboxylic acid salt group is polymerized, and a method in which after a monomer having a carboxylic acid group is polymerized, the polymer is neutralized with an alkali compound to form a carboxylic acid salt group. When preparing the polymer compound, other known monomers can be used if desired. However, when acrylamide or a monomer generating a cation is used in combination, agglomeration is often caused. Therefore, when using such a monomer, it is preferable to adjust the added amount of the monomer.

The polymer compound for use in the ink of this disclosure can be synthesized by known synthesizing methods. For example, a method including dissolving a monomer capable of forming the unit (A), a monomer capable of forming the unit (B), and another optional monomer in a solvent; and copolymerizing the monomers under a nitrogen gas atmosphere using a polymerization initiator can be used.

The polymer compound preferably has a weight average molecular weight of from 500 to 20,000 (which is determined by gel permeation chromatography (GPC) using Pullulan conversion), and more preferably from 1,000 to 10,000, so that the resultant ink has a proper viscosity and the polymer can be well adsorbed on a pigment.

The polymer compound for use in the ink of this disclosure can be used as one ink constituent, but is preferably used as a dispersant for a pigment to be included in the ink. Specifically, it is preferable that initially a pigment dispersion is prepared using a polymer compound as a dispersant, and then the pigment dispersion is mixed with other ink components. This is because the polymer compound can be well adsorbed on the pigment.

(Pigment)

The pigment included in the ink is a black pigment or a color pigment.

Specific examples of the material for use as a black pigment include carbon black such as KETJEN BLACK, furnace black, acetylene black, thermal black, and gas black. Carbon black, whose surface is subjected to an oxidation treatment or an alkaline treatment, can be preferably used. In addition, carbon black, which is covered with a surfactant or a resin or which is subjected to a grafting treatment or an encapsulating treatment can also be used.

Particularly, when acidic carbon black whose surface is subjected to an oxidization treatment using ozone or the like is used, the drying property of the ink is enhanced while producing an image density enhancing effect. In addition, carbon black coated with a resin having a sulfonic acid group or a carboxyl group or carbon black subjected to a graft treatment to incorporate a sulfonic acid group or a carboxyl group into the carbon black can also be preferably used.

Specific examples of marketed acidic carbon blacks include MA7, MA8, MA100, MA600, #45, #50, #2200B, #2350, #2650, OIL 7B, and OIL 11B (from Mitsubishi Chemical Corporation); RAVENs 1035, 1040, 1060, 1080, 1255, 3500 and C (from Columbian Chemicals (Aditya Birla Group)); REGAL 400R and MOGUL L (from Cabot Corporation); and COLOR BLACKs FW1, FW18, S150, S160 and S170, PRINTEXs U, V, 75, 140U and 140V, SPECIAL BLACKs 4, 100, 250 and 350, and NIPEXs 150 and 1801Q (from Degussa A.G.).

Among these carbon blacks, carbon blacks having a pH of not greater than 5, and a volatile content of from 3.5 to 8.0% by weight are preferable. In addition, gas blacks are preferable because the resultant ink has good drying property while producing high density images.

Specific examples of the material for use as a magenta pigment include Pigment Reds 5, 7, 12, 48 (Ca), 48(Mn), 57(Ca), 57:1, 112, 122, 123, 168, 184 and 202; and Pigment Violet 19.

Specific examples of the material for use as a cyan pigment include Pigment Blues 1, 2, 3, 15, 15:3, 15:4, 16, 22 and 60; and Vat Blues 4 and 60.

Specific examples of the material for use as a yellow pigment include Pigment Yellows 1, 2, 3, 12, 13, 14, 16, 17, 73, 74, 75, 83, 93, 95, 97, 98, 114, 120, 128, 129, 138, 150, 151, 154, 155 and 180.

Among these pigments, it is preferable to use Pigment Yellow 74 (as a yellow pigment), Pigment Red 122 or Pigment Violet 19 (as a magenta pigment), and a Pigment Blue 15 (as a cyan pigment), because the resultant full color images have good color tones, and light resistance, i.e., a well-balanced ink set can be provided.

The content of a pigment in the pigment dispersion or the ink is preferably from 0.1 to 50% by weight, and more preferably from 0.1 to 30% by weight, based on the weight of the pigment dispersion or the ink.

Particularly when carbon black is used as a pigment, the effect of this disclosure can be produced most satisfactorily.

(Penetrant)

When a penetrant is included in the ink, the surface tension of the ink decreases, filling property of the ink into nozzles is enhanced, and ejection stability thereof is enhanced. In addition, since the ink rapidly penetrates into a recording medium such as paper, chance of occurrence of feathering and color bleeding problems can be decreased.

Surfactants or solvents having good penetrating property are preferably used as the penetrant.

The penetrant for use in the ink of this disclosure preferably includes at least one polyol compound which can be dissolved in water at 20° C. in an amount of from 0.2% to 5.0% by weight. Specific examples of such a polyol compound include aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,2,4-trimethyl-1,3-pentanediol, 2,5-dimethyl-2,5-hexanediol, 2-ethyl-1,3-hexanediol, and 5-hexene-1,2-diol. Among these compounds, 2-ethyl-1,3-hexanediol, and 2,2,4-trimethyl-1,3-pentanediol are preferable.

Another compound, which can be dissolved in the ink and which can adjust properties of the ink so as to fall in desired ranges, can be used as a penetrant in combination with the above-mentioned penetrant. Specific examples thereof include alkyl or aryl ethers of polyalcohols such as diethylene glycol monophenyl ether, ethylene glycol monophenyl ether, ethylene glycol monoallyl ether, ethylene glycol monobutyl ether, propylene glycol monobutyl ether, and tetraethylene glycol chlorophenyl ether; and lower alcohols such as ethanol.

The content of such a penetrant in the ink is preferably from 0.1 to 4.0% by weight based on the weight of the ink. When the content is less than 0.1% by weight, the ink adhered to a recording paper is not dried rapidly, thereby often forming a blurred image. When the content is greater than 4.0% by weight, the dispersibility of a colorant in the ink tends to deteriorate, thereby often causing a nozzle clogging problem in that a nozzle is clogged with aggregated particles of the colorant. In addition, the ink excessively penetrates into a recording paper, thereby causing the low density image problem and the ink penetration problem in that an ink image penetrates through a recording material (such as recording paper) to an extent such that the image can be seen from the backside of the recording material.

(Hydrazide Compound)

Suitable materials for use as the hydrazide compound to be optionally included in the ink include polyfunctional hydrazide compounds. Specific examples thereof include carbohydrazide, oxalic acid dihydrazide, malonic acid dihydrazide, succinic acid dihydrazide, glurtaric acid dihydrazide, adipic acid dihydrazide, pimelic acid dihydrazide, suberic acid dihydrazide, azelaic acid dihydrazide, sebacic acid dihydrazide, dodecane dihydrazide, hexadecane dihydrazide, terephthalic acid dihydrazide, isophthalic acid dihydrazide, 2,6-naphthoic acid dihydrazide, 4,4'-bisbenzene dihydrozide, 1,4-cyclohexane dihydrazide, tartaric acid dihydrazide, malic acid dihydrazide, iminodiacetic acid dihydrazide, N,N'-hexamethylenebissemicarbazide, itaconic acid dihydrazide, ethylenediamine tetraacetic acid tetrahydrazide, citric acid trihydrazide, butane tricarbohydrazide, 1,2,3-benzene trihydrazide, 1,4,5,8-naphthoic acid tetrahydrazide, nitriloacetic acid trihydrazide, cyclohexanetricarboxylic acid trihydrazide, pyromellitic acid tetrahydrazide, and polyacrylic acid hydrazide (i.e., N-aminopolyacrylamide). In addition, polyfunctional hydrazide derivatives, which are prepared by reacting these polyfunctional hydrazide compounds with a ketone such as acetone and methyl ethyl ketone, can also be used. Among these hydrazide compounds, adipic acid dihydrazide, and polyacrylic acid hydrazide ar preferable from viewpoints of safety and reactivity with a carbonyl group.

The added amount of such a hydrazide compound is determined based on the polymer compound used and the added amount of the polymer compound, but is generally from 1 part to 100 parts by weight, preferably from 5 parts to 50 parts by weight, and more preferably from 8 parts to 20 parts by weight, based on 100 parts by weight of the polymer compound used, because the resultant ink can produce high density images.

(Other Ink Components)

The ink of this disclosure can optionally include other known additives such as dispersants, water-soluble organic solvents, resins, wetting agents, surfactants, pH controlling agents, antiseptics/fungicides, chelating agents, antinists, antioxidants, ultraviolet absorbents, oxygen absorbents, and light stabilizers. These additives can be included in the pigment dispersion.

(Dispersant)

Carbon black subjected to an oxidation treatment using ozone can be well dispersed even when a dispersant is not used. However, a dispersant can be used for dispersing a pigment as long as the dispersant does not deteriorate the effect of the ink of this disclosure.

Suitable materials for use as the dispersant include surfactants such as anionic surfactants, cationic surfactants, ampholytic surfactants, and nonionic surfactants; and polymer dispersants. These materials can be used alone or in combination.

It is more preferable to use the polymer compound mentioned above as the dispersant.

Specific examples of the anionic surfactants include alkylsulfocarboxylic acid salts, α-olefin sulfonic acid salts, polyoxyethylene alkyl ether acetic acid salts, N-acylamino acids and salts thereof, salts of N-acyl-N-methyl taurine, polyoxyalkylether sulfuric acid salts, polyoxyethylene alkyl ether phosphoric acid salts, rosin acid soaps, salts of sulfates of castor oil, salts of sulfates of lauryl alcohol, alkylphenol-type phosphates, formalin condensates of naphthalenesulfonate, alkyl-type phosphoric acid esters, alkylarylsulfonic acid salts, diethylsulfosuccinic acid salts, diethylhexylsulfosuccinic acid salts, and dioctylsulfosuccinic acid salts.

Specific examples of the cationic surfactants include 2-vinylpiridine derivatives, and poly-4-vinylpiridine derivatives.

Specific examples of the ampholytic surfactants include lauryldimethylaminoacetic acid betaine, 2-alkyl-N-carboxymethyl-N-hydroxyethylimidazolinium betaine, palm oil fatty acid amide propyldimethylaminoacetic acid betaine, polyoctylpolyaminoethylglycine, and imidazoline derivatives.

Specific examples of the nonionic surfactants include ethers such as polyoxyethylene alkyl ethers and polyoxyalkylaryl ethers (e.g., polyoxyethylene nonylphenyl ether, polyoxyethylene octylphenyl ether, polyoxyethylene dodecylphenyl ether, polyoxyethylene lauryl ether, and polyoxyethylene oleyl ether); esters (e.g., polyoxyethylene monooleate, polyoxyethylene monostearate, polyoxyethylene distearate, sorbitan laurate, sorbitan monostearate, sorbitan monooleate, and sorbitan sesquioleate; and acetylene glycol type surfactants (e.g., 2,4,7,9-tetramethyl-5-decyne-4,7-diol, 3,6-dimethyl-4-octyne-3,6-diol, and 3,5-dimethyl-1-hexyne-3-ol.

(Water-Soluble Organic Solvent)

Specific examples of such water-soluble organic solvents include alcohols such as methanol, ethanol, 1-propanol and 2-propanol; polyalcohols such as ethylene glycol, diethylene glycol, triethylene glycol, polypropylene glycol, and glycerin; pyrrolidone derivatives such as N-methyl-2-pyrrolidone, and 2-pyrrolidone; ketones such as acetone and methyl ethyl ketone; and alkanol amines such as monoethanolamine, diethanolamine, and triethanolamine.

(Resin)

Suitable materials for use as the resin to be included in the ink include resins having good film forming property (i.e., image forming property) while having a good combination of water repellency, water resistance, and weather resistance. By using such a resin, images having high image density (i.e., good coloring property) and good water resistance can be produced. For example, polycondensation type synthetic resins, polyaddition type synthetic resins, and natural polymer compounds can be used.

Specific examples of such polycondensation type synthetic resins include polyester resins, polyurethane resins, epoxy resins, polyamide resins, poly(meth)acrylic resins, acrylic-silicone resins, and fluorine-containing resins.

Specific examples of such polyaddition type synthetic resins include polyolefine resins, polystyrene resins (including styrene copolymers such as styrene-butadiene copolymers and styrene-acrylic copolymers), polyvinyl ester resins, acrylic resins, and unsaturated carboxylic acid resins.

Specific examples of such natural polymer compounds include cellulose resins, rosins, and natural rubbers.

The volume average particle diameter (D50) of such a resin in the ink is preferably not greater than 500 nm. When the volume average particle diameter is greater than 500 nm, the nozzle clogging problem tends to be caused.

The content of a resin in the ink is properly adjusted depending on the species and added amount of other additives in the ink, but is preferably from 0.05 to 30% by weight, more preferably from 0.5 to 20% by weight, and even more preferably from 1 to 10% by weight, based on the weight of the ink.

(Wetting Agent)

Suitable materials for use as the wetting agent include polyalcohols, polyalcohol alkyl ethers, polyalcohol aryl ethers, nitrogen-containing heterocyclic compounds, amides, amines, sulfur-containing compounds, propylene carbonate, ethylene carbonate, and other wetting agents, but are not limited thereto. These materials can be used alone or in combination.

Specific examples of the polyalcohols include ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentanediol, 1,6-hexanediol, trimethylol ethane, trimethylol propane, glycerin, 1,2,3-butanetriol, 1,2,4-butanetriol, 1,2,6-hexanetriol, and petriol.

Specific examples of the polyalcohol alkyl ethers include ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, and propyleneglycol monoethyl ether.

Specific examples of the polyalcohol aryl ethers include ethyleneglycol monophenyl ether, and ethyleneglycol monobenzyl ether.

Specific examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam and γ-butyrolactone.

Specific examples of the amides include formamide, N-methylformamide, and N,N-dimethylformamide.

Specific examples of the amines include monoethanolamine, diethanolamine, triethanolamine, monoethylamine, diethylamine, and triethylamine.

Specific examples of the sulfur-containing compounds include dimethylsulfoxide, sulfolane and thiodiethanol.

Saccharide can also be used as wetting agents. Suitable materials for use as the saccharide include monosaccharide, disaccharide, oligosaccharide (including tri- and tetra-saccharide), and polysaccharide. Specific examples of the saccharide include glucose, mannose, fructose, ribose, xylose, arabinose, galactose, maltose, cellobiose, lactose, sucrose, trehalose, and maltotriose. In this regard, polysaccharide is polysaccharide in a broad sense, and includes materials such as α-cyclodextrin, and cellulose, which are found in nature. In addition, specific examples of derivatives of the saccharide mentioned above include reduction sugar of the saccharide such as sugar alcohols having a formula $HOCH_2(CHOH)nCH_2OH$ (n=2–5), oxidized sugar such as aldonic acid and uronic acid, amino acids, and thio acids. Among these materials, sugar alcohols are preferable, and specific examples thereof include maltitol and sorbit.

Among these wetting agents, glycerin, diethylene glycol, triethylene glycol, 1,3-butanediol, 3-methyl-1,3-butanediol, 2-pyrrolidone, and N-methyl-2-pyrrolidone are preferable because a good combination of preservation stability and ejection stability can be imparted to the ink.

The weight ratio of a pigment to a wetting agent significantly influences the ejection stability of the ink. When the amount of a wetting agent is relatively small compared to the amount of the pigment included in the ink, water in the surface portion (meniscus) of the ink in a nozzle excessively evaporates, thereby causing a defective ejection problem in that the ink is not satisfactorily ejected from the nozzle.

The content of a wetting agent in the ink is from 20 to 35% by weight, and preferably from 22.5 to 32.5% by weight, based on the weight of the ink so that the ink can have a good combination of drying property, preservability and reliability. When the content of a wetting agent is less than 20% by weight, the ink tends to easily dry in a nozzle, thereby often causing the defective ejection problem. In contrast, when the content is greater than 35% by weight, the drying property of the ink tends to deteriorate when images are formed on a paper, thereby deteriorating image qualities of the image.

(Surfactant)

When a surfactant is used for the ink, it is preferable to select a proper surfactant in consideration of the properties of the pigment and wetting agent used. In general, it is preferable to use a surfactant which has a low surface tension and a high leveling property without deteriorating the dispersion stability of the pigment used. Specifically, it is preferable to use a fluorine-containing surfactant or a silicone-type surfactant, and it is more preferable to use a fluorine-containing surfactant.

Suitable materials for use as the fluorine-containing surfactant include fluorine-containing surfactants in which the number of carbon atoms substituted with a hydrogen atom is from 2 to 16, and more preferably from 4 to 16. When the number of carbon atoms substituted with a fluorine atom is less than 2, the effect of fluorine is not satisfactorily produced. When the number of carbon atoms substituted with a fluorine atom is greater than 16, the preservability of the ink tends to deteriorate.

Specific examples of such a fluorine-containing surfactant include perfluoroalkylsulfonic acid compounds, perfluoroalkylcarboxylic acid compounds, perfluoroalkylphosphate compounds, perfluoroalkylethyleoxide adducts, and polyoxyalkyleneether polymer compounds having a perfluoroalkylether group in a side chain. Among these compounds, polyoxyalkyleneether polymer compounds having a perfluoroalkylether group in a side chain are preferable because the resultant ink hardly foams.

Specific examples of the perfluoroalkylsulfonic acid compounds include perfluoroalkylsulfonic acids, and salts thereof. Specific examples of the perfluoroalkylcarboxylic acid compounds include perfluoroalkylcarboxylic acids, and salts thereof. Specific examples of the perfluoroalkylphosphate compounds include perfluoroalkylphosphates, and salts thereof. Specific examples of the polyoxyalkyleneether polymer compounds having a perfluoroalkylether group in a side chain include polyoxyalkyleneether polymers having a perfluoroalkylether group in a side chain, sulfates thereof, and salts thereof.

Specific examples of the counter ion of salts of these fluorine-containing surfactants include ions of Li, Na, K, $NH_4$, $NH_3CH_2CH_2OH$, $NH_2(CH_2CH_2OH)_2$, and $NH(CH_2CH_2OH)_3$.

Synthesized or marketed fluorine-containing surfactants can be used. Specific examples of the marketed fluorine-containing surfactants include FS-300 from Du Pont; FT-110, FT-250, FT-251, FT-400S, FT-150 and FT-400SW from Neos Co., Ltd.; and PF-151N from Omnova Solutions.

The silicone-type surfactant for use in the ink is not particularly limited, and is properly selected according to the purpose of the ink. However, it is preferable to use a silicone-type surfactant which hardly decomposes at a high pH. Specific examples thereof include polydimethylsiloxane, whose side chain is modified, polydimethylsiloxane, both of whose ends are modified, polydimethylsiloxane, one of whose ends is modified, and polydimethylsiloxane, in which both ends and side chains thereof are modified. In this regard, the group used for modification is preferably a polyoxyethylene group, or a polyoxyethylenepolyoxypropylene group because the resultant silicone-type surfactant has good properties as a water-soluble surfactant.

Synthesized or marketed silicone-type surfactants can be used. Marketed silicone-type surfactants are available from Byk Chemie, Shin-Etsu Chemical Co., Ltd., and Dow Corning Toray silicone Co., Ltd.

The content of such a surfactant in the ink is preferably from 0.01 to 3.0% by weight, and more preferably from 0.5 to 2.0% by weight, based on the weight of the ink. When the content is less than 0.01% by weight, the effect of the surfactant is hardly produced. When the content is greater than 3.0%, the ink tends to excessively penetrate into a recording paper, thereby causing the low density image problem and the ink penetration problem in that an ink image penetrates through a recording material to an extent such that the image can be seen from the backside of the recording material.

(pH Controlling Agent)

Any pH controlling agents can be used as long as the pH controlling agents can adjust the pH of the ink so as to be from 7 to 11 without deteriorating other properties of the ink. Suitable materials for use as the pH controlling agent include alcohol amines, alkali metal hydroxides, ammonium hydroxides, phosphonium hydroxides, and alkali metal carbonates. When the pH of the ink is less than 7 or greater than 11, the recording head used and the ink supplying unit used are easily dissolved by the ink, thereby causing problems in that the properties of the ink change, the ink leaks from the recording head and the ink supplying unit, and the ink is not satisfactorily ejected from nozzles.

Specific examples of the alcohol amines include diethanolamine, triethanolamine, and 2-amino-2-ethyl-1,3-propanediol.

Specific examples of the alkali metal hydroxides include lithium hydroxide, sodium hydroxide, and potassium hydroxide.

Specific examples of the ammonium hydroxides include ammonium hydroxide, and hydroxides of quaternary ammoniums.

Specific examples of the phosphonium hydroxides include hydroxides of quaternary phosphoniums.

Specific examples of the alkali metal carbonates include lithium carbonate, sodium carbonate, and potassium carbonate.

(Antiseptic/Fungicide)

Specific examples of the antiseptics/fungicides include sodium dehydroacetate, sodium sorbate, sodium 2-pyridinethiol-oxide, sodium benzoate, and sodium pentachlorophenol.

(Chelating Agents)

Specific examples of the chelating agents include sodium ethylenediaminetetraacetate, sodium nitrilotriacetate, sodium hydroxyethylethylenediaminetriacetate, sodium diethylenetriaminepentaacetate, and sodium uramildiacetate.

(Antirusts)

Specific examples of the antirusts include acidic sulfites, sodium thiosulfate, ammonium thiodiglycolate, diisopropylammonium nitrite, pentaerythritol tetranitrate, and dicyclohexylammonium nitrite.

(Antioxidants)

Suitable materials for use as the antioxidants include phenol-type antioxidants (including hindered phenol-type antioxidants), amine-type antioxidants, sulfur-containing antioxidants, and phosphorous-containing antioxidants.

Specific examples of the phenol-type antioxidants include butylated hydroxyanisole, 2,6-di-t-butyl-4-ethylphenol, stearyl-β-(3,5-di-t-butyl-4-hydroxyphenyl)propionate, 2,2'-methylenebis(4-methyl-6-t-butylphenol), 2,2'-methylenebis(4-ethyl-6-t-butylphenol), 4,4'-butylidenebis(3-methyl-6-t-butylphenol), 3,9-bis{1,1-dimethyl-2-[β-(3-t-butyl-4-hydroxy-5-methylphenyl)propionyloxy]ethyl}-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, and tetrakis[methylene-3-(3',5'-di-t-butyl-4'-hydroxyphenyl)propionate]methane, 2,6-di-t-butyl-p-cresol, 2,6-di-t-butylphenol, 2,4-dimethyl-6-t-butylphenol, butylhydroxyanisole, 4,4'-thiobis(3-methyl-6-t-butylphenol), tetrakis[methylene-3-(3,5-di-t-butyl-4-dihydroxyphenyl)propionate]methane, and 1,1,3-tris(2-methyl-4-hydroxy-5-t-butylphenyl)butane.

Specific examples of the amine-type antioxidants include phenyl-β-naphtylamine, α-naphthylamine, N,N'-di-sec-butyl-p-phenylenediamine, phenothiazine, and N,N'-di-phenyl-p-phenylenediamine.

Specific examples of the sulfur-containing antioxidants include dilauryl-3,3'-thiodipropionate, distearylthiodipropionate, laurylstearylthiodipropionate, dimyristyl-3,3'-thiodipropionate, distearyl-β-β'-thiodipropionate, 2-mercaptobenzoimidazole, and dilaurylsulfide.

Specific examples of the phosphorous-containing antioxidants include triphenyl phosphite, octadecyl phosphite, triisodecyl phosphite, trilauryl trithiophosphite, and trinonylphenyl phosphite.

(Ultraviolet Absorbents)

Suitable materials for use as the ultraviolet absorbent include benzophenone-type ultraviolet absorbents, benzotriazole-type ultraviolet absorbents, salicylate-type ultraviolet absorbents, cyanoacrylate-type ultraviolet absorbents, and nickel complex-type ultraviolet absorbents.

Specific examples of the benzophenone-type ultraviolet absorbents include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Specific examples of the benzotriazole-type ultraviolet absorbents include 2-(2'-hydroxy-5'-t-octylphenyl)benzotriazole, 2-(2'-hydroxy-5'-methylphenyl)benzotriazole, 2-(2"-hydroxy-4'-octoxyphenyl)benzotriazole, and 2-(2'-hydroxy-3'-t-butyl-5'-methylphenyl)-5-chlorobenzotriazole.

Specific examples of the salicylate-type ultraviolet absorbents include phenyl salicylate, p-t-butylphenyl salicylate, and p-octylphenyl salicylate.

Specific examples of the cyanoacrylate-type ultraviolet absorbents include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex-type ultraviolet absorbents include nickelbis(octylphenyl)sulfide, 2,2'-thiobis(4-t-octylferrate)-n-butylaminenickel(II), 2,2'-thiobis(4-t-octylferrate)-2-ethylhexylaminenickel(II), and 2,2'-thiobis(4-t-octylferrate)triethanolaminenickel(II).

(Ink Preparation Method)

The ink of this disclosure can be prepared by a known method. For example, a method in which ink components such as a pigment, a penetrant, a polymer compound, and water, and other optional components are mixed can be used. In this regard, it is preferable to use a method in which after a pigment dispersion including at least water and a pigment is prepared, the other components are added to the pigment dispersion.

Such a pigment dispersion is typically prepared by mixing water, a pigment and an optional dispersant, and subjecting the mixture to a dispersing treatment using a dispersing machine such as a sand mill, a ball mill, a roll mill, a bead mill, a nanomizer, a homogenizer, and a supersonic dispersing machine to adjust the particle diameter of the pigment. In this regard, it is preferable to use the above-mentioned polymer compound as the dispersant.

The concentration of the pigment in the pigment dispersion is preferably from 0.1 to 50% by weight, and more preferably from 0.1 to 30% by weight.

It is preferable that the pigment dispersion and/or the ink is filtered using a filter or a centrifugal separator to remove coarse particles therefrom, followed by optional deaeration.

The content of a pigment in the ink is preferably from 1 to 20% by weight based on the weight of the ink. When the content is less than 1% by weight, unclear images are formed due to low image density. When the content is greater than 20% by weight, the viscosity of the ink tends to seriously increase, and the nozzle clogging problem tends to be caused.

(Ink cartridge)

Next, the ink cartridge of this disclosure will be described.

The ink cartridge of this disclosure includes a container in which the ink of this disclosure is contained, and optionally includes other members.

The ink cartridge is not particularly limited, and the shape, structure, dimension and constitutional materials of the container are properly determined depending on the purpose of the ink cartridge. For example, ink bags made of an aluminum-laminated film, or a resin film can be preferably used.

Figure 3:
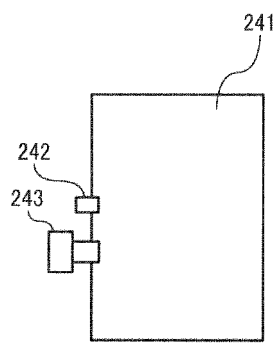
FIG. 3 is a schematic view illustrating an ink bag of an ink cartridge according to an embodiment.
Figure 4:
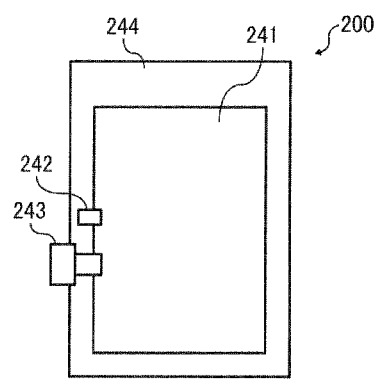
FIG. 4 is a schematic view illustrating an ink cartridge containing the ink bag illustrated in FIG. 3.

The ink cartridge will be described by reference to FIGS. 3 and 4. FIG. 3 is a schematic view illustrating an example of an ink bag 241 of the ink cartridge of this disclosure, and FIG. 4 is a schematic view illustrating an ink cartridge 200 containing the ink bag 241 in a cartridge case 244.

As illustrated in FIG. 3, the ink of this disclosure is fed into the ink bag 241 (serving as a container) of the ink cartridge 200 from an ink inlet 242. After discharging air from the ink bag 241, the ink inlet 242 is closed by welding or the like. When the ink cartridge 200 is used, the ink cartridge 200 is set in an inkjet printer (such as the printer 101 illustrated in FIG. 1) so that a needle of the inkjet printer is inserted into an ink outlet 243 of the ink cartridge 200, and therefore the ink in the ink bag 241 is supplied to a main body of the printer 101. The ink bag 241 is typically made of a material having low permeability to gas such as wrapping materials (e.g., aluminum-laminated films). The ink bag 241 is contained in the cartridge case 244 (illustrated in FIG. 4) typically made of a plastic. The resultant ink cartridge 200 is typically used by being detachably attached to an image forming apparatus, preferably the inkjet recording apparatus of this disclosure mentioned later.

(Inkjet Recording Apparatus)

The inkjet ink of this disclosure can be applied to various image recording apparatuses using an inkjet recording method such as inkjet recording printers, facsimiles, copiers, and multifunctional products having functions of printer, facsimile and copier.

Hereinafter, the inkjet recording apparatus of this disclosure will be described by reference to an inkjet recording apparatus used for evaluating inkjet inks of Examples and Comparative Examples.

FIG. 1 is a schematic perspective view illustrating a serial inkjet recording apparatus as an inkjet recording apparatus according to an embodiment.

The inkjet recording apparatus illustrated in FIG. 1 includes a main body 101 thereof, a recording sheet feed tray 102, which is attached to the main body 101 and on which a stack of recording sheets is set, a copy tray 103, which is attached to the main body 101 and on which recording sheets bearing ink images thereon are stacked, and an ink cartridge setting portion 104 to which ink cartridges 200 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 200 can be attached to the ink cartridge setting portion 104 or detached therefrom. Numerals 111 and 112 respectively denote an upper cover of the inkjet recording apparatus, and a front cover of the apparatus.

Figure 2:
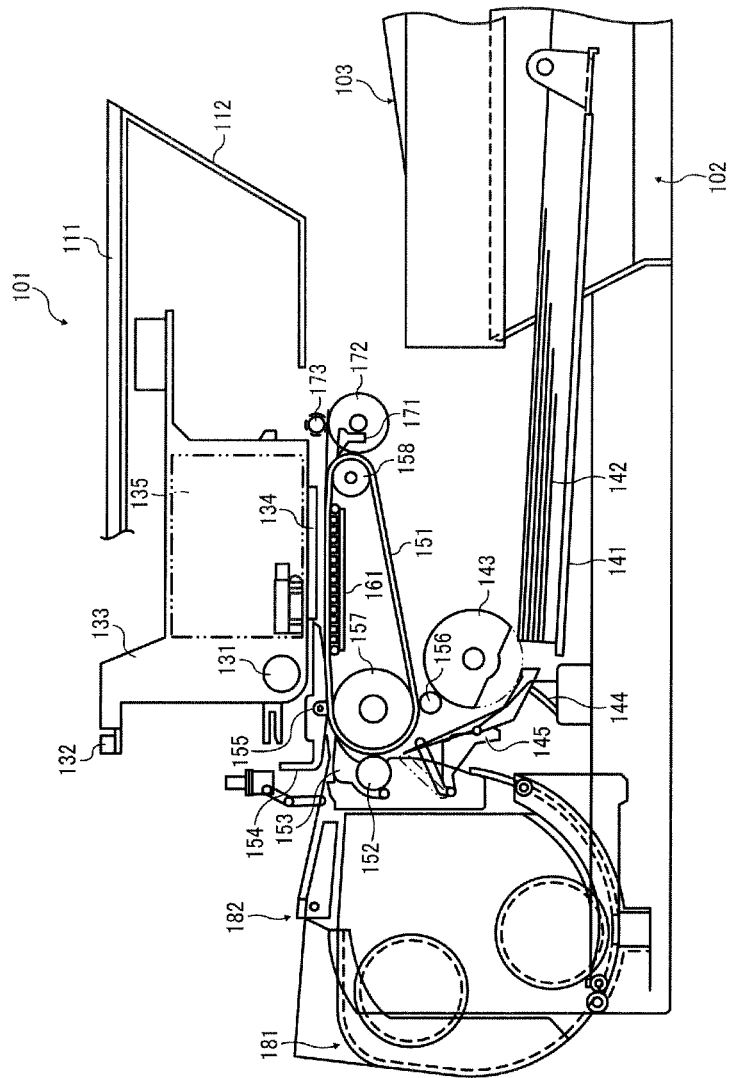
FIG. 2 is a schematic side view illustrating the internal configuration of the serial inkjet recording apparatus.

As illustrated in FIGS. 1 and 2, a carriage 133 is slidably supported by a guide rod 131 and a stay 132, which are supported by both side plates (not shown) of the main body 101, so that the carriage 133 is moved in a main scanning direction by a main scanning motor (not shown) to perform a scanning operation (i.e., an image forming operation).

An inkjet recording head 134 including four inkjet recording heads, each of which has multiple nozzles arranged in a direction perpendicular to the main scanning direction to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 200 set to the ink cartridge setting portion 104 are supplied to the respective sub-tanks 135 via respective ink supplying tubes (not shown).

The inkjet recording apparatus includes a recording sheet supplier to feed recording sheets 142 set on a sheet loading portion (pressing plate) 141. The recording sheet supplier includes a sheet feeding roller 143 to feed the recording sheets 142, and a separation pad 144, which faces the sheet feeding roller 143 while being biased toward the sheet feeding roller 143 and which is made of a material having a high friction coefficient, to feed the recording sheets 142 one by one from the sheet loading portion 141.

The inkjet recording apparatus further includes a feeder to feed the recording sheet 142, which is fed from the recording sheet supplier, toward the image recording area located below the inkjet recording head 134. The feeder includes a feeding belt 151 to feed the recording sheet 142 while electrostatically attracting the recording sheet, a counter roller 152 to feed the recording sheet 142, which is fed from the recording sheet supplier along a guide 145, while sandwiching the recording sheet 142 with the feeding belt 151, a direction changing guide 153 to change the direction of the recording sheet 142, which is fed substantially vertically, at an angle of about 90° so that the recording sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction) perpendicular to the main scanning direction. For example, the feeding belt 151 includes a first layer (i.e., an uppermost layer), which electrostatically attracts the recording sheet 142 and which is made of a resin layer (such as a tetrafluoroethylene-ethylene copolymer (ETFE) whose electric resistance is not controlled) with a thickness of about 40 µm, and a second layer (i.e., a medium resistance layer or a grounding layer), which is made of almost the same material as that of the first layer except that carbon black is included therein so that the second layer has a medium electric resistance.

In addition, a guide member 161 is arranged below the feeding belt 151 so as to face the image recording area in which an image is recorded on the recording sheet 142 by the inkjet recording head 134.

The inkjet recording apparatus further includes a sheet discharger to discharge the recording sheet 142, which bears an image recorded by the inkjet recording head 134, from the main body 101. The sheet discharger includes a separation pick 171 to separate the recording sheet 142 from the feeding belt 151, and discharging rollers 172 and 173 to discharge the recording sheet 142 toward the copy tray 103 located below the discharging roller 172.

A duplex copy unit 181 is detachably attached to the backside of the main body 101 of the inkjet recording apparatus. The duplex copy unit 181 receives the recording sheet 142, which is fed to the duplex copy unit 181 by reversely rotating the feeding belt 151, and feeds again the recording sheet 142 to the nip between the counter roller 152 and the feeding belt 151 so that another image is formed on the backside of the recording sheet 142 by the inkjet recording heads 134 in the image recording area.

A manual sheet feeder 182, by which a recording sheet can be manually fed to the inkjet recording apparatus, is provided above the duplex copy unit 181.

(Inkjet Recording Method)

Next, the inkjet recording method of this disclosure will be described. The recording sheet 142 is supplied one by one by the recording material supplier. The recording sheet 1.42 thus fed in substantially the vertical direction is guided by the guide 145 to the nip between the feeding belt 151 and the counter roller 152 so as to be fed by the feeding belt 151 and the counter roller 152. Further, the recording sheet 142 is guided by the direction changing guide 153 so that the direction of the sheet is changed at an angle of about 90°. The recording sheet 142 is then fed by the feeding belt 151 while pressed toward the feeding belt 151 by the pressing roller 155.

In this regard, since the feeding belt 151 is charged by the charging roller 156, the recording sheet 142 is fed by the feeding belt 151 while electrostatically adhered thereto. Next, the carriage 133 is moved in the main scanning direction while the inkjet recording head 134 is driven according to image signals so as to eject droplets of the color inkjet inks to form one line image on the surface of the recording sheet 142, which is stopped in the image forming operation. After recording one line image, the recording sheet 142 is fed in a predetermined length in the sub-scanning direction, and the next image forming operation is performed to form another one line image on the surface of the recording material sheet 142. By repeating the image forming operation, an image is formed on the surface of the recording material sheet 142. When the inkjet recording apparatus receives a signal such that the image recording operation is completed or the rear edge of the recording sheet 142 reaches the image recording area, the inkjet recording apparatus stops the image forming operation, and the sheet discharger discharges the recording sheet 142 bearing the image thereon to the copy tray 103.

When it is detected that the inkjet ink in the sub tank 135 is substantially exhausted (i.e., near-end of ink is detected), a predetermined amount of ink is supplied to the sub tank 135 from the corresponding ink cartridge 200.

When the inkjet ink in the ink cartridge 200 is exhausted, it is possible that after the ink cartridge is disassembled, the ink bag in the ink cartridge is replaced with a new ink bag, and then the ink cartridge 200 is assembled again to be attached to the inkjet recording apparatus. Even when the ink cartridge 200 is set so as to be vertical from a front side of the inkjet recording apparatus as illustrated in FIG. 1, the ink in the ink cartridge 200 can be stably supplied to the corresponding sub tank 135. Therefore, even when the ink cartridge cannot be set from the upper side of the main body 101 of the inkjet recording apparatus due to space limitation (for example, in a case where the apparatus is set in a rack or an object is set on the upper surface of the apparatus), the ink cartridge 200 can be easily replaced.

Hereinbefore, the inkjet recording apparatus of this disclosure has been described by reference to a serial (shuttle-type) inkjet recording apparatus in which a carriage is scanned in the main scanning direction. However, the inkjet recording apparatus is not limited thereto, and can include a line inkjet recording apparatus using a line-type inkjet recording head.

(Print)

Next, the print formed using the inkjet ink of this disclosure will be described.

The ink of this disclosure can form a print in which an image of the ink is formed on a recording medium serving as a support. The recording medium is not particularly limited. Specific examples of the recording medium (support) include papers such as plain papers, gloss papers, and general-purpose printing papers; and other materials such as woods, plastics, metals, glass and ceramics.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

(Preparation of Polymer of Example 1)

The following components were fed into a flask equipped with an agitator, a thermometer, a dropping funnel and a reflux condenser.

| | |
|---|---|
| Diacetone acrylamide | 30 parts |
| Methacrylic acid | 70 parts |
| Ethanol | 50 parts |

After air in the flask was substituted with a nitrogen gas, the mixture was heated to 80° C. Next, 0.5 parts of 2,2'-azobisisobutyronitrile was dropped into the flask using the dropping funnel to perform a polymerization reaction for 6 hours.

After performing the polymerization reaction, ethanol vapor was fed into the flask to prepare a 50% ethanol solution of a diacetone acrylamide-methacrylic acid copolymer. By washing the copolymer with ethanol, followed by drying, a solid diacetone acrylamide-methacrylic acid copolymer, in which the weight ratio of the diacetone acrylamide unit to the methacrylic acid unit is 30/70, was prepared. The copolymer was mixed with distilled water, and then sodium hydroxide was dropped into the mixture to adjust the pH of the mixture to 7. Thus, a 20% aqueous solution of diacetone acrylamide-methacrylic acid copolymer was prepared.

(Preparation of Pigment Dispersion of Example 1)

The following components were mixed.

| | |
|---|---|
| Carbon black | 20.0 parts |
| (NIPEX 150 from Evonik industries) | |
| 20% Aqueous solution of copolymer prepared above | 19.0 parts |
| Distilled water | 61.0 parts |

The mixture was subjected to a dispersing treatment using a disc-type batch bead mill, KDL-type batch bead mill from Shinmaru Enterprises Corp. The dispersing conditions were as follows.
(1) Bead used: Zirconia beads with a diameter of 0.3 mm
(2) Peripheral speed of disc: 10 m/s
(3) Temperature of the mixture: 10° C.
(4) Dispersing time: 5 minutes Next, coarse particles were removed from the resultant dispersion using a centrifugal separator (MODEL 3600 from Kubota Corp. As a result, a pigment dispersion of Example 1 having a volume average particle diameter of 125 nm and a standard deviation of particle diameter of 60.2 nm was prepared.

(Preparation of Ink of Example 1)

The following components were mixed for 30 minutes while agitated.

| | |
|---|---|
| Pigment dispersion prepared above | 40.0 parts |
| (Pigment content of 20% by weight) | |
| Glycerin | 5.5 parts |
| 1,3-Butanediol | 16.5 parts |
| 2-Ethyl-1,3-hexanediol | 2.0 parts |
| Fluorine-containing surfactant | 2.5 parts |
| (ZONYL FS-300 from Du Pont, solid content of 40% by weight) | |
| Fluoroethylene - vinyl ether alternate copolymer | 6.0 parts |
| (LUMIFLON FE4300 from Asahi Glass Co., Ltd., solid content of 50%, volume average particle diameter of 150 nm, minimum film forming temperature (MFT) of not higher than 30° C.) | |
| Distilled water | 18.6 parts |

Next, a 40% aqueous solution of aminoethylpropanediol was added to the mixture to adjust the pH to 10, and the mixture was agitated for 30 minutes. Thus, an ink of Example 1 was prepared.

Examples 2 to 9

(Preparation of Polymer Compounds of Examples 2 to 9)

The procedure for preparation of the polymer compound in Example 1 was repeated except that the monomers used for preparing the polymer compound and the added amounts thereof were changed as described in Table 1 to prepare 20% aqueous solutions of polymer compounds of Examples 2 to 9.

(Preparation of Pigment Dispersions of Examples 2 to 9)

The procedure for preparation of the pigment dispersion in Example 1 was repeated except that the 20% aqueous solution of the polymer compound was replaced with each of the 20% aqueous solutions of the polymer compounds of Examples 2 to 9. Thus, pigment dispersions of Examples 2 to 9 having a pigment content of 20% by weight were prepared.

(Preparation of Inks of Examples 2 to 9)

The procedure for preparation of the ink in Example 1 was repeated except that the pigment dispersion was replaced with each of the pigment dispersions of Examples 2 to 9. Thus, inks of Examples 2 to 9 were prepared.

Examples 10 and 11

(Preparation of Polymer Compounds of Examples 10 and 11)

The procedure for preparation of the polymer compound in Example 1 was repeated except that the monomers used for preparing the polymer compound and the added amounts thereof were changed as described in Table 1 and sodium hydroxide was replaced with potassium hydroxide to prepare 20% aqueous solutions of polymer compounds of Examples 10 and 11, which have a pH of 7.

(Preparation of Pigment Dispersions of Examples 10 and 11)

The procedure for preparation of the pigment dispersion in Example 1 was repeated except that the 20% aqueous solution of the polymer compound was replaced with each of the 20% aqueous solutions of the polymer compounds of Examples 10 and 11. Thus, pigment dispersions of Examples 10 and 11 having a pigment content of 20% by weight were prepared.

(Preparation of Inks of Examples 10 and 11)

The procedure for preparation of the ink in Example 1 was repeated except that the pigment dispersion was replaced with each of the pigment dispersions of Examples 10 and 11. Thus, inks of Examples 10 and 11 were prepared.

Example 12

(Preparation of Ink)

The following components were mixed for 30 minutes while agitated.

| | |
|---|---|
| Pigment dispersion of Example 10 (Pigment content of 20% by weight) | 40.0 parts |
| Glycerin | 5.5 parts |
| 1,3-Butanediol | 16.5 parts |
| 2-Ethyl-1,3-hexanediol | 2.0 parts |
| Fluorine-containing surfactant (ZONYL FS-300 from Du Pont, solid content of 40% by weight) | 2.5 parts |
| Fluoroethylene - vinyl ether alternate copolymer (LUMIFLON FE4300 from Asahi Glass Co., Ltd., solid content of 50%, volume average particle diameter of 150 nm, minimum film forming temperature (MFT) of not higher than 30° C.) | 6.0 parts |
| Adipic acid dihydrazide | 2.0 parts |
| Distilled water | 18.6 parts |

Next, a 40% aqueous solution of aminoethylpropanediol was added to the mixture to adjust the pH to 10, and the mixture was agitated for 30 minutes. Thus, an ink of Example 12 was prepared.

Example 13

(Preparation of Ink)

The procedure for preparation of the ink in Example 12 was repeated except that the pigment dispersion was replaced with the pigment dispersion of Example 11. Thus, an ink of Example 13 was prepared.

Example 14

(Preparation of Ink)

The procedure for preparation of the ink in Example 12 was repeated except that the pigment dispersion was replaced with the pigment dispersion of Example 11, and adipic acid dihydrazide was replaced with sebasic acid dihydrazide. Thus, an ink of Example 14 was prepared.

Example 15

(Preparation of Ink)

The procedure for preparation of the ink in Example 12 was repeated except that the pigment dispersion was replaced with the pigment dispersion of Example 11, and adipic acid dihydrazide was replaced with polyacrylic acid dihydrazide. Thus, an ink of Example 15 was prepared.

Comparative Examples 1 to 4

(Preparation of Polymer Compounds)

The procedure for preparation of the polymer compound in Example 1 was repeated except that the monomers used for preparing the polymer compound and the added amounts thereof were changed as described in Table 2 to prepare polymer compounds of Comparative Examples 1 to 4.

(Preparation of Pigment Dispersions)

The procedure for preparation of the pigment dispersion in Example 1 was repeated except that the 20% aqueous solution of the polymer compound was replaced with each of the 20% aqueous solutions of the polymer compounds of Comparative Examples 1 to 4. Thus, pigment dispersions of Comparative Examples 1 to 4 having a pigment content of 20% by weight were prepared.

(Preparation of Inks)

The procedure for preparation of the ink in Example 1 was repeated except that the pigment dispersion was replaced with each of the pigment dispersions of Comparative Examples 1 to 4. Thus, inks of Comparative Examples 1 to 4 were prepared.

Comparative Example 5

(Preparation of Ink)

The procedure for preparation of the ink in Example 12 was repeated except that the pigment dispersion was replaced with the pigment dispersion of Comparative Example 1. Thus, an ink of Comparative Example 5 was prepared.

Comparative Example 6

(Preparation of Pigment Dispersion)

The procedure for preparation of the pigment dispersion in Example 1 was repeated except that the 20% aqueous solution of the polymer compound was replaced with a 20% aqueous solution of a diacetoneacrylamide-fatty acid vinyl ester copolymer (DF-05 from JAPAN VAM & POVAL CO., LTD.). Thus, a pigment dispersion of Comparative Example 6 having a pigment content of 20% by weight was prepared.

(Preparation of Ink)

The procedure for preparation of the ink in Example 1 was repeated except that the pigment dispersion was replaced with the pigment dispersion of Comparative Example 6. Thus, an ink of Comparative Example 6 was prepared.

Comparative Example 7

(Preparation of Ink)

The procedure for preparation of the ink in Example 12 was repeated except that the pigment dispersion was replaced with the pigment dispersion of Comparative Example 6. Thus, an ink of Comparative Example 7 was prepared.

Comparative Example 8

(Preparation of Polymer Compound)

The procedure for preparation of the polymer compound in Example 1 was repeated except that the monomers used for preparing the polymer compound and the added amounts thereof were changed as described in Table 2 to prepare a 20% aqueous solution of a polymer compound of Comparative Example 8.

(Preparation of Pigment Dispersion)

The procedure for preparation of the pigment dispersion in Example 1 was repeated except that the 20% aqueous solution of the polymer compound was replaced with the 20% aqueous solution of the polymer compound of Comparative Example 8. Thus, pigment dispersion of Comparative Example 8 having a pigment content of 20% by weight was prepared.

(Preparation of Ink)

The procedure for preparation of the ink in Example 1 was repeated except that the pigment dispersion was replaced with the pigment dispersion of Comparative Example 8. Thus, an ink of Comparative Example 8 was prepared.

Comparative Example 9

(Preparation of Ink)

The procedure for preparation of the ink in Example 12 was repeated except that the pigment dispersion was replaced with the pigment dispersion of Comparative Example 8. Thus, an ink of Comparative Example 9 was prepared.

Comparative Example 10

(Preparation of Polymer Compound)

The procedure for preparation of the polymer compound in Example 1 was repeated except that the monomers used for preparing the polymer compound and the added amounts thereof were changed as described in Table 2 to prepare a 20% aqueous solution of a polymer compound of Comparative Example 10.

(Preparation of Pigment Dispersion)

The procedure for preparation of the pigment dispersion in Example 1 was repeated except that the 20% aqueous solution of the polymer compound was replaced with the 20% aqueous solution of the polymer compound of Comparative Example 10. Thus, pigment dispersion of Comparative Example 10 having a pigment content of 20% by weight was prepared.

(Preparation of Ink)

The procedure for preparation of the ink in Example 1 was repeated except that the pigment dispersion was replaced with the pigment dispersion of Comparative Example 10. Thus, an ink of Comparative Example 10 was prepared.

Comparative Example 11

(Preparation of Polymer Compound)

The procedure for preparation of the polymer compound in Example 1 was repeated except that the monomers used for preparing the polymer compound and the added amounts thereof were changed as described in Table 2 to prepare a 20% aqueous solution of a polymer compound of Comparative Example 11.

(Preparation of Pigment Dispersion)

The procedure for preparation of the pigment dispersion in Example 1 was repeated except that the 20% aqueous solution of the polymer compound was replaced with the 20% aqueous solution of the polymer compound of Comparative Example 11. Thus, pigment dispersion of Comparative Example 11 having a pigment content of 20% by weight was prepared.

(Preparation of Ink)

The procedure for preparation of the ink in Example 1 was repeated except that the pigment dispersion was replaced with the pigment dispersion of Comparative Example 11. Thus, an ink of Comparative Example 11 was prepared.

The inks of Examples 1-15 and Comparative Examples 1-11 were evaluated as follows.

1. Preservation Stability of Ink

Each ink was contained in a container while sealed, and preserved for 2 weeks at 70° C. The viscosity of the ink was measured before and after the preservation test to determine the rate of change in viscosity. The rate of change in viscosity is determined from the following equation:

$$\text{Rate of change in viscosity }(RC)(\%)=\{(Va-Vb)\times 100\}/Vb,$$

wherein $Va$ represents the viscosity of the ink after the preservation test, and $Vb$ represents the viscosity of the ink before the preservation test.

In this regard, the smaller rate of change in viscosity the ink has, the better preservation stability the ink has. The preservation stability of ink was graded as follows.

⊚: The rate of change in viscosity is not greater than 10%. (Excellent)

◯: The rate of change in viscosity is greater 10% and not greater than 50%. (Acceptable)

Δ: The rate of change in viscosity is greater than 50% and not greater than 100%. (Bad9

X: The rate of change in viscosity is greater than 100%. (Seriously bad)

2. Ejection Stability of Ink

Each of the inkjet inks was contained in an ink cartridge. Each of the ink cartridges was set to an inkjet recording apparatus having such a structure as illustrated in FIGS. 1 and 2 (IPSIO GX e5500 from Ricoh Co., Ltd.).

After ink images were continuously produced for 10 minutes using the above-mentioned inkjet recording apparatus, the inkjet recording head of the inkjet recording apparatus, to which the ink is adhered, was capped with a moisturizing cap. After inkjet recording apparatus was allowed to settle in a chamber in which temperature and humidity are controlled so as to be 50° C. and 60% RH, the inkjet recording head was subjected to cleaning so that the recording head achieves the same state as that before the preservation test.

Next, an intermittent printing test was performed as follows to evaluate the ejection stability of the ink.

Specifically, 20 copies of a print pattern chart having an image area proportion of 5% were continuously produced by the above-mentioned inkjet recording apparatus, and then the image forming operation was stopped for 20 minutes. After the image formation cycle including the image forming operation and the 20-minute pause thereafter was repeated 50 times to produce 1,000 copies, one copy of the printer pattern chart was formed, and a solid image of the copy was visually observed to determine whether the solid image has a streak image, an omission, and a defective image caused by defective ejection of the ink.

In this regard, the recording conditions of the printer were as follows.

Duty: 100%

Record density: 600×300 dpi

Recording method: One-pass recording method (recording is performed only when the recording head is moved forward)

The ejection stability of the ink was graded as follows.
⊚: The solid image has no streak image, omission and defective image. (Excellent)
○: The image has a slight streak image, a slight omission and a slight defective image. (Acceptable)
Δ: The image has a local streak image, a local omission and a local defective image. (Bad)
X: The image has streak images, omissions and defective images throughout the solid image. (Seriously bad)

3. Image Density

Each of the inkjet inks was contained in an ink cartridge. Each of the ink cartridges was set to an inkjet recording apparatus having such a structure as illustrated in FIGS. 1 and 2 (IPSIO GX e5500 from Ricoh Co., Ltd.). An A-4 size solid image was formed on an A-4 size recording medium, a PPC (plain paper copier) paper 4024 from Xerox Corp. under the following conditions.

Record density: 600×300 dpi
Recording method: One-pass recording method (recording is performed only when the recording head is moved forward)

The image density of the solid image was measured with a spectrodensitometer X-RITE 938 from X-Rite Corp. The image density was graded as follows.
⊚: The image density is not lower than 1.25. (Excellent)
○: The image density is not lower than 1.15 and lower than 1.25. (Good)
Δ: The image density is not lower than 1.10 and lower than 1.15. (Acceptable)
X: The image density is lower than 1.10. (Bad)

The evaluation results are shown in Tables 1 and 2 below.

TABLE 1

| | Polymer compound | | | Evaluation results | | |
|---|---|---|---|---|---|---|
| | Monomers used (% by weight) | Salt | Hydrazide compound | Preservation stability | Ejection stability | Image density |
| Ex. 1 | DAAM (30)-MAA (70) | Na | — | ⊚ | ○ | Δ |
| Ex. 2 | DAMAM (30)-AA (70) | Na | — | ⊚ | ○ | Δ |
| Ex. 3 | DAA (30)-MA (30)-MMA (40) | Na | — | ⊚ | ○ | Δ |
| Ex. 4 | DAAM (60)-MAA (40) | Na | — | ⊚ | ⊚ | Δ |
| Ex. 5 | DAMAM (60)-AA (40) | Na | — | ⊚ | ⊚ | Δ |
| Ex. 6 | DAA (60)-MA (30)-MMA (10) | Na | — | ⊚ | ⊚ | Δ |
| Ex. 7 | DAAM (90)-MAA (10) | Na | — | ⊚ | ⊚ | Δ |
| Ex. 8 | DAMAM (90)-AA (10) | Na | — | ⊚ | ⊚ | Δ |
| Ex. 9 | DAA (90)-MA (5)-MMA (5) | Na | — | ⊚ | ⊚ | Δ |
| Ex. 10 | DAAM (30)-MAA (70) | K | — | ⊚ | ⊚ | ○ |
| Ex. 11 | DAMAM (60)-AA (40) | K | — | ⊚ | ⊚ | ○ |
| Ex. 12 | DAAM (30)-MAA (70) | K | Adipic acid dihydrazide | ⊚ | ⊚ | ⊚ |
| Ex. 13 | DAMAM (60)-AA (40) | K | Adipic acid dihydrazide | ⊚ | ⊚ | ⊚ |
| Ex. 14 | DAMAM (60)-AA (40) | K | Sebacic acid dihydrazide | ⊚ | ⊚ | ⊚ |
| Ex. 15 | DAMAM (60)-AA (40) | K | Polyacrylic acid dihydrazide | ⊚ | ⊚ | ⊚ |

DAAM: Diacetone acrylamide
MAA: Methacrylic acid
DAMAM: Diacetone methacrylamide
AA: Acrylic acid
DAA: Diacetone acrylate
MA: Maleic acid
MMA: Methyl methacrylate

TABLE 2

| | Polymer compound | | | Evaluation results | | |
|---|---|---|---|---|---|---|
| | Monomers used (% by weight) | Salt | Hydrazide compound | Preservation stability | Ejection stability | Image density |
| Comp. Ex. 1 | DAAM (20)-MAA (80) | Na | — | Δ | Δ | X |
| Comp. Ex. 2 | DAMAM (20)-AA (80) | Na | — | Δ | Δ | X |
| Comp. Ex. 3 | DAA (20)-MA (40)-MMA (40) | Na | — | Δ | Δ | X |
| Comp. Ex. 4 | DAAM (100) | Na | — | Evaluation could not be performed because the polymer compound was separated so as to be present in the surface portion of the ink. | | |
| Comp. Ex. 5 | DAAM (20)-MAA (80) | Na | Adipic acid dihydrazide | Δ | Δ | X |
| Comp. Ex. 6 | DAAM-FAVE (DF-05) | — | — | X | Δ | X |
| Comp. Ex. 7 | DAAM-FAVE (DF-05) | — | Adipic acid dihydrazide | X | X | Δ |
| Comp. Ex. 8 | DAAM (10)-MAA (10)-NIPAM (80) | Na | — | X | X | X |

TABLE 2-continued

| | Polymer compound | | | Evaluation results | | |
|---|---|---|---|---|---|---|
| | Monomers used (% by weight) | Salt | Hydrazide compound | Preservation stability | Ejection stability | Image density |
| Comp. Ex. 9 | DAAM (10)-MAA (10)-NIPAM (80) | Na | Adipic acid dihydrazide | X | X | X |
| Comp. Ex. 10 | DAAM (30)-NIPAM (70) | Na | — | X | X | X |
| Comp. Ex. 11 | DAAM (90)-NIPAM (10) | Na | — | X | X | X |

DAAM: Diacetone acrylamide
MAA: Methacrylic acid
DAMAM: Diacetone methacrylamide
AA: Acrylic acid
DAA: Diacetone acrylate
MA: Maleic acid
MMA: Methyl methacrylate
FAVE: Fatty acid vinyl ester
DF-05: Diacetoneacrylamide - fatty acid vinyl ester copolymer from JAPAN VAM & POVAL CO., LTD.
NIPAM: N-isopropyl acrylamide It is clear from Tables 1 and 2 that the inks of Examples I to 15 have better preservation stability than the comparative inks of Comparative Examples 1 to 11.

The inks of Examples 4 to 9, in which the amount of the unit (A) of the polymer compound is from 60% to 90% by weight, have much better ejection stability than the inks of Examples 1 to 3, in which the amount of the unit (A) of the polymer compound is 30% by weight.

In addition, the inks of Examples 10 and 11, in which the polymer compounds are a potassium salt, can produce higher density images.

Further, the inks of Examples 12 to 15, in which the polymer compounds are a potassium salt and a hydrazide compound is used, can produce highest density images.

As mentioned above, the inkjet ink of this disclosure has a good combination of preservation stability and ejection stability and can produce high density images even on plain papers.

Additional modifications and variations of the present invention are possible in light of the above teachings. It is therefore to be understood that within the scope of the appended claims the invention may be practiced other than as specifically described herein.

What is claimed is:

1. An inkjet ink comprising:
   water;
   a penetrant;
   a pigment; and
   a polymer compound,
   wherein the polymer compound includes a unit (A) including a functional group having the below-mentioned formula (1) or (2), and another unit (B) including a carboxyl group,
   wherein an amount of the unit (A) included in the polymer compound is from 60% to 90% by weight based on a total weight of the polymer compound:

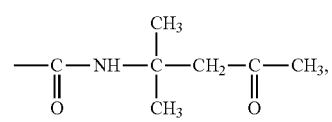

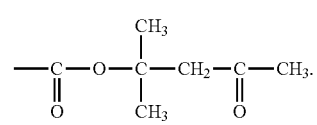

2. The inkjet ink according to claim 1, wherein the carboxyl group of the unit (B) has a form of potassium salt.

3. The inkjet ink according to claim 1, further comprising:
   a hydrazide compound.

4. An ink cartridge comprising:
   a container; and
   the inkjet ink according to claim 1 contained in the container.

5. An inkjet recording apparatus comprising:
   the ink cartridge according to claim 4; and
   an inkjet recording head to eject droplets of the inkjet ink contained in the ink cartridge to form an ink image of the inkjet ink on a recording medium.

6. An inkjet recording method comprising:
   ejecting droplets of the inkjet ink according to claim 1 from an inkjet recording head to form an ink image of the inkjet ink on a recording medium.

7. A print comprising:
   a support; and
   an ink image of the inkjet ink according to claim 1 located on the support.

* * * * *